US011643994B2

(12) United States Patent
Holder et al.

(10) Patent No.: US 11,643,994 B2
(45) Date of Patent: May 9, 2023

(54) ROCKET PROPULSION SYSTEMS AND ASSOCIATED METHODS

(71) Applicant: Radian Aerospace, Inc., Renton, WA (US)

(72) Inventors: Livingston L. Holder, Renton, WA (US); Gary C. Hudson, Renton, WA (US); Bevin C. McKinney, Renton, WA (US)

(73) Assignee: Radian Aerospace, Inc., Renton, WA (US)

( * ) Notice: Subject to any disclaimer, the term of this patent is extended or adjusted under 35 U.S.C. 154(b) by 0 days.

(21) Appl. No.: 17/133,090

(22) Filed: Dec. 23, 2020

(65) Prior Publication Data

US 2021/0363939 A1     Nov. 25, 2021

Related U.S. Application Data

(63) Continuation of application No. PCT/US2019/040325, filed on Jul. 2, 2019.

(Continued)

(51) Int. Cl.
    F02K 9/52       (2006.01)
    B64G 1/14       (2006.01)
(Continued)

(52) U.S. Cl.
    CPC ............... F02K 9/52 (2013.01); B64G 1/14 (2013.01); B64G 1/401 (2013.01); F02K 9/42 (2013.01);
(Continued)

(58) Field of Classification Search
    CPC ... F02K 9/42; F02K 9/52; F02K 9/566; F02K 9/605; F02K 9/62; F02K 9/82; F02K 9/86; B64G 1/402
See application file for complete search history.

(56) References Cited

U.S. PATENT DOCUMENTS 2,569,887 A    10/1951   Daniel
2,709,887 A *   6/1955   Goddard .................. F02K 9/52
                                                 60/915

(Continued)

FOREIGN PATENT DOCUMENTS

EP           0778200       6/1997
GB           2211155       6/1989
(Continued)

OTHER PUBLICATIONS

International Search Report and Written Opinion for International Patent Application No. PCT/US2019/040325, Applicant: Radian Aerospace, dated Oct. 3, 2019, 7 pages.

(Continued)

*Primary Examiner* — Todd E Manahan
*Assistant Examiner* — Kyle Robert Thomas
(74) *Attorney, Agent, or Firm* — Perkins Coie LLP

(57) ABSTRACT

Rocket propulsion systems and associated methods are disclosed. A representative system includes a combustion chamber having an inwardly-facing chamber wall enclosing a combustion zone. The chamber has a generally spherical shape and is exposed to the combustion zone. A propellant injector is coupled to the combustion chamber and has at least one fuel injector nozzle positioned to direct a flow of cooling fuel radially outwardly along the inwardly-facing chamber wall. In addition to or in lieu of the foregoing features, the injector can include an oxidizer piston and a fuel piston that deliver oxidizer and fuel, respectively, to the combustion chamber, in a sequenced manner so that the oxidizer is introduced prior to the fuel.

13 Claims, 11 Drawing Sheets

Related U.S. Application Data

(60) Provisional application No. 62/693,829, filed on Jul. 3, 2018.

(51) Int. Cl.
*B64G 1/40* (2006.01)
*F02K 9/42* (2006.01)
*F02K 9/56* (2006.01)
*F02K 9/60* (2006.01)
*F02K 9/82* (2006.01)
*F02K 9/86* (2006.01)

(52) U.S. Cl.
CPC .............. *F02K 9/566* (2013.01); *F02K 9/605* (2013.01); *F02K 9/82* (2013.01); *F02K 9/86* (2013.01)

(56) References Cited

U.S. PATENT DOCUMENTS

| | | | |
|---|---|---|---|
| 2,734,702 A | 2/1956 | Northrop et al. | |
| 3,088,406 A | 5/1963 | Horner | |
| 3,137,128 A * | 6/1964 | Francais | F02K 9/56 60/213 |
| 3,170,286 A * | 2/1965 | Stein | F02K 9/52 60/267 |
| 3,722,219 A * | 3/1973 | Spencer | F02K 9/52 60/258 |
| 3,768,254 A * | 10/1973 | Stuart | F02K 7/08 60/204 |
| 4,802,639 A | 2/1989 | Hardy et al. | |
| 4,894,986 A * | 1/1990 | Etheridge | F02K 9/52 60/258 |
| 5,626,310 A | 5/1997 | Kelly | |
| 5,683,033 A * | 11/1997 | Thayer | F02K 9/82 239/265.17 |
| 6,185,927 B1 * | 2/2001 | Chrones | F02K 9/52 239/424 |
| 6,394,391 B1 | 5/2002 | Lo | |
| 6,569,171 B2 | 5/2003 | Bulman | |
| 10,612,493 B2 * | 4/2020 | Ruffino | F02K 9/56 |
| 2006/0225794 A1 * | 10/2006 | Reinicke | F16K 24/06 137/614.17 |
| 2008/0072607 A1 | 3/2008 | Haberbusch | |
| 2010/0044494 A1 * | 2/2010 | Teacherson | B64G 1/005 244/2 |
| 2011/0042521 A1 | 2/2011 | Sample | |
| 2016/0069299 A1 * | 3/2016 | Ruffino | F02K 9/84 60/770 |
| 2020/0198809 A1 | 6/2020 | Holder et al. | |

FOREIGN PATENT DOCUMENTS

| | | |
|---|---|---|
| RU | 2046071 | 10/1995 |
| RU | 2096273 | 11/1997 |
| RU | 2155147 | 8/2000 |
| RU | 2187446 | 8/2002 |
| RU | 2193510 | 11/2002 |
| RU | 2196078 | 1/2003 |
| RU | 2215673 | 11/2003 |
| RU | 2217619 | 11/2003 |
| RU | 2386890 | 4/2010 |
| RU | 2577908 | 3/2016 |
| RU | 2581756 | 4/2016 |
| WO | WO-2008066512 | 6/2008 |

OTHER PUBLICATIONS

Bulman, Melvin J., "Thrust Augmented Nozzle (TAN): the New Paradigm for Booster Rockets (Preprint)," American Institute of Aeronauctics and Astrnautics, 2006, 9 pages.

Extended European Search Report for European Patent Application No. 19831324.9, Applicant: Radian Aerospace, Inc., dated Sep. 27, 2022, 7 pages.

* cited by examiner

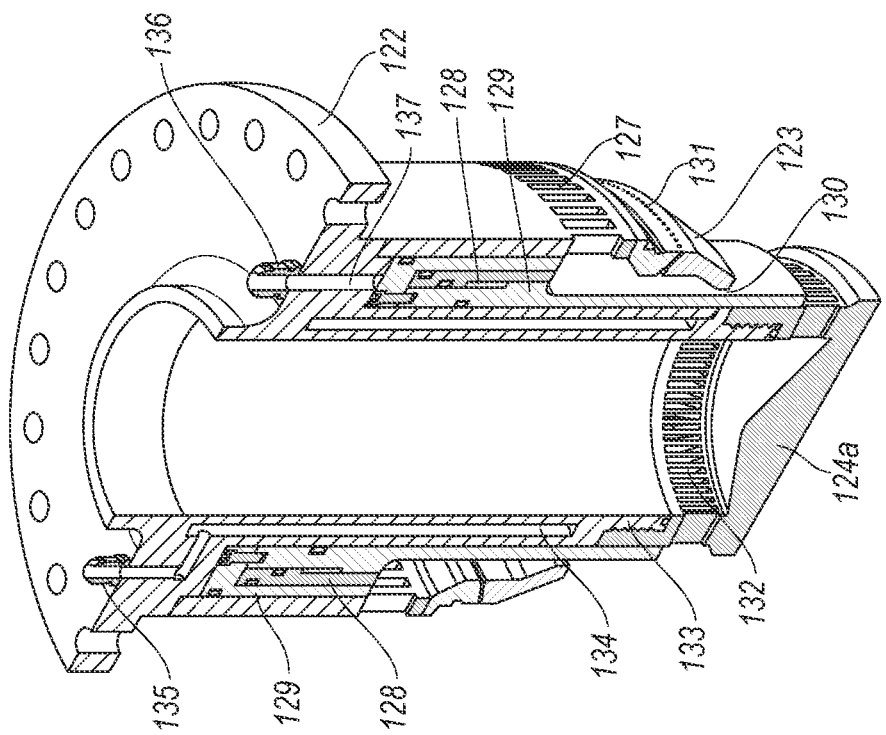
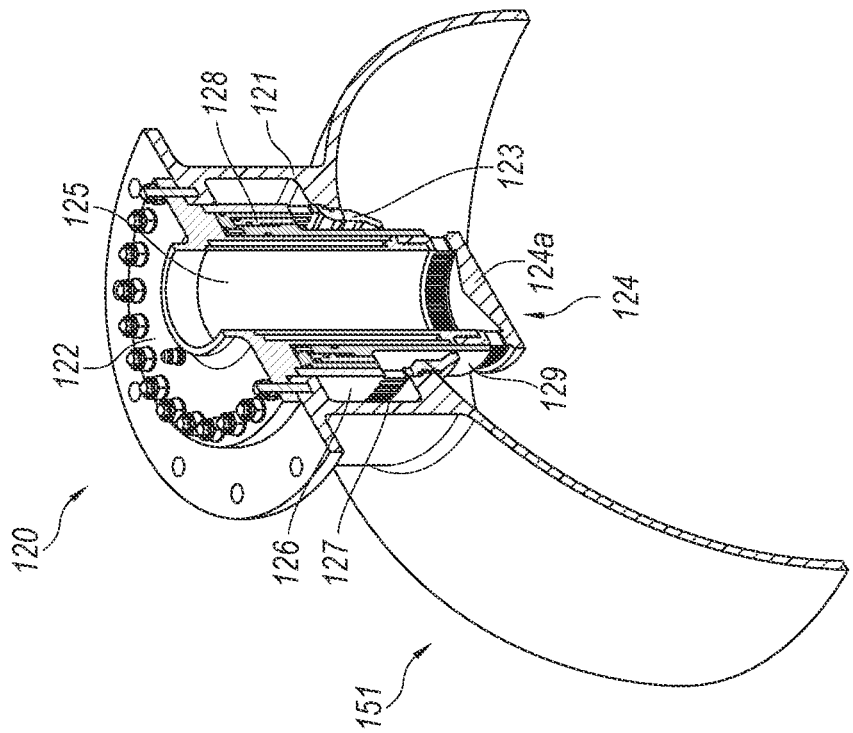

ROCKET PROPULSION SYSTEMS AND ASSOCIATED METHODS

CROSS-REFERENCE TO RELATED APPLICATION

The present application claims priority to U.S. Provisional Application No. 62/693,829, filed on Jul. 3, 2018, and incorporated herein by reference.

TECHNICAL FIELD

The present technology is directed to rocket propulsion systems and associated methods.

BACKGROUND

Rockets propelled by rocket engines have been used for many years to launch payloads into Earth orbit and beyond. Persistent challenges associated with such systems include reducing system weight and complexity, providing adequate cooling to the rocket engine components, providing for efficient combustion, and providing efficient thrust over altitudes ranging from sea level to the vacuum of space. Aspects of the presently disclosed technology are directed toward addressing, singly and/or in combination, the foregoing challenges.

BRIEF DESCRIPTION OF THE DRAWINGS

FIGS. 4A and 4B are partially schematic, cross-sectional views of a propellant injector configured in accordance with embodiments of the present technology.

DETAILED DESCRIPTION

Figure 1:
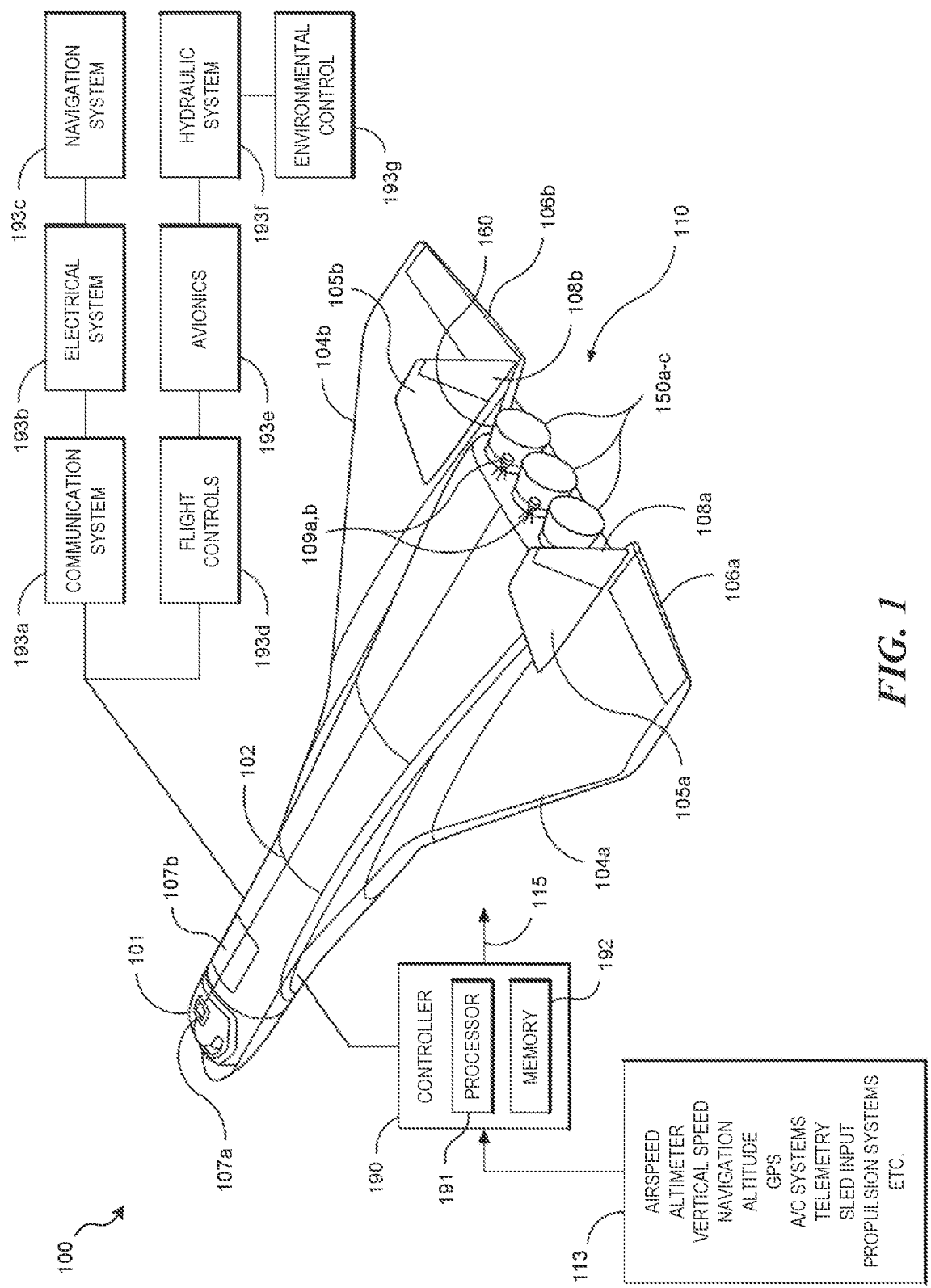
FIG. 1 is a partially schematic, top rear isometric view of a representative rocket-propelled aerospace vehicle configured in accordance with embodiments of the present technology.

Several embodiments of the present technology are directed to rocket propulsion systems and associated methods. In representative embodiments, the propulsion system can include an injector that directs a cooling flow of rocket fuel along the walls of a spherical combustion chamber, without the need for ducts at the combustion chamber to convey the cooling flow. Accordingly, the combustion chamber can be lighter and less complex than conventional combustion chambers. The injector can be configured to deliver not only the cooling flow, but the main propellant flow into the combustion chamber, and can sequence the flows to enhance cooling. Cooling flows can also be used to cool a gas generator, which provides power to corresponding fuel and oxidizer pumps for delivering these propellant constituents into the combustion chamber. The resulting exhaust flow, exiting the combustion chamber through a nozzle, can be controlled using fluid injection to account for varying external pressures as a function of altitude. The tanks that contain the propellant constituents, and associated valving systems, can be configured to constrain the pressure differentials to which the tanks are subjected, so as to reduce the loads on the tanks, and therefore the weight of the tanks, as well as allow the tanks to have shapes that conform more closely to the contours of the vehicle.

Specific details of several embodiments of the disclosed technology are described below with reference to particular, representative configurations. The disclosed technology can be practiced in accordance with representative rocket configurations shown herein, and/or with other rocket systems. Although the following disclosure sets forth several representative embodiments of different aspects of the disclosed technology, some embodiments of the technology can have configurations and/or components different than those described in this section. Accordingly, the present technology can include some embodiments with additional elements, and/or without several of the elements described below with reference to FIGS. 1-10B.

Several embodiments of the technology described below may take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller, or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a liquid crystal display.

The technology can also be practiced in distributed environments, where tasks or modules are performed by remote processing devices that are linked through a communications network. In a distributed computing environment, program modules or subroutines may be located within local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

FIG. 1 is a partially schematic, top rear isometric view of an aerospace vehicle 100 (which can also be referred to as a spaceplane) configured in accordance with embodiments of the present technology. In the illustrated embodiment, the vehicle 100 is an HTHL/SSTO (Horizontal Take-off, Horizontal Landing/Single Stage to Orbit) vehicle having a pair of highly swept wings 104 (identified individually as a left wing 104a and a right wing 104b) extending outwardly from a fuselage 102 to provide lift during flight in the Earth's atmosphere. The trailing edge portion of each of the wings 104a, b includes a corresponding elevon 106a, b for vehicle pitch and roll control. Additionally, the vehicle 100 includes a pair of vertical stabilizers 105 (identified individually as a left vertical stabilizer 105a and a right vertical stabilizer 105b) having corresponding rudders 108a, b on trailing edge portions thereof for providing the vehicle 100 with yaw control. The fuselage 102 can include a door 107a in an upper portion of a crew cabin 101 for crew ingress and egress. Additionally, in the illustrated embodiment the forward portion of the fuselage 102 includes a movable hatch 107b for providing access to a docking port (not shown in FIG. 1) for docking the vehicle 100 with an on-orbit station, such as the ISS (International Space Station), and enabling human and/or cargo movement therebetween.

As shown in FIG. 1, in the illustrated embodiment the aft portion of the fuselage 102 carries a propulsion system 110 having one or more rocket engines 150 (three are shown in FIG. 1; identified individually as first, second, and third rocket engines 150a-c, respectively). Each of the engines 150a-c has a corresponding nozzle 160 positioned generally proximate the trailing edge portion of the wings 104a, b between the vertical stabilizers 105a, b. In some embodiments the rocket engines 150a-c are configured to burn liquid oxygen (LOX) and jet fuel, as propellants. The jet fuel can include common kerosene-types of aviation fuel designed for use in aircraft powered by gas-turbine engines including, for example, "Jet-A." Additionally, in some embodiments the engines 150a-c can include dual area ratio nozzles with injection ports for tripping the exhaust flow. When the injection ports are inactive, the exhaust flow occupies the entire cross-sectional area at the exit plane of the nozzle 160, producing a first effective nozzle area. The area ratio of the first effective nozzle area to the area at the nozzle throat can be relatively large, which is suitable for high altitude performance. For example, the area ratio can be about 60:1 in some embodiments. When the injection ports are activated, the flow from the injection ports trips the exhaust flow and produces a shockwave that limits the effective flow over of the nozzle 160 to a smaller, second effective nozzle area. The area ratio of the second effective nozzle area to the area at the nozzle throat can be relatively small, for example, about 33:1. Accordingly, since the nozzle flow is typically over-expanded at low altitude (as a compromise to improve high altitude performance), the nozzle exit area reduction provided by the tripped exhaust flow can improve nozzle efficiency at low altitude.

The vehicle 100 can further include orbital maneuvering system (OMS) engines 109 (identified individually as a first OMS engine 109a and a second OMS engine 109b) having nozzles positioned just above the nozzles for the main engines 150a-c. In some embodiments, the OMS engines 109 can be bipropellant rocket engines that use LOX and compressed natural gas (CNG; consisting mostly of methane). The use of LOX and CNG provides a gas-gas propellant solution that can be used in a blowdown system that relies on gas pressure to drive the propellants into the OMS engines 109. The OMS engines provide steering and directional control when the vehicle 100 is in space, and can enable the vehicle 100 to reorient in space for deorbiting and reentry into the Earth's atmosphere. Although the illustrated embodiment of the vehicle 100 includes three main engines 150 that use LOX and Jet-A as propellants, the technology disclosed herein is not limited to any particular number of engines or any particular types of propellants. Accordingly, it will be understood that vehicles configured in accordance with the present technology can include more or fewer engines using other types of propellants (e.g., LOX and refined petroleum (e.g., RP-1), LOX/liquid hydrogen, LOX/CNG, etc.) consistent with the present disclosure.

The vehicle 100 can include a controller 190 having one or more processors 191 that can control various operations and functions of the vehicle 100 in accordance with computer-readable instructions stored on one or more system memories 192. The controller 190 can receive inputs 113 and issue outputs 115. By way of example, the inputs 113 can include control signals and commands from, e.g., ground systems, the crew, etc.; flight parameters such as airspeed and/or ground speed, altitude, dynamic pressure, temperature, etc.; engine operating parameters; propellant parameters; vehicle positional and directional information; etc. The outputs 115 can include commands directing vehicle operation, including control surface operation via associated valves, actuators, and/or other components; engine operation including start, stop, and throttle settings; data and telemetry transmissions; etc. The processor 191 can include any logic processing unit, such as one or more central processing units (CPUs), digital signal processors (DSPs), accelerated processing units (APUs), application-specific integrated circuits (ASICs), etc. The processor 191 may be a single processing unit or multiple processing units distributed across multiple systems and/or subsystems of the vehicle 100. The processor 191 is operably connected to the memory 192 and may be operably connected to various systems of the vehicle 100 to transmit instructions and/or receive input therefrom. The memory 192 can include read-only memory (ROM), random-access memory (RAM), and/or other storage devices that store executable applications, test software, databases, and/or other software required to, for example, control, or at least partially control, the flight, propulsion, power, avionics, telemetry, environmental, and/or other systems of the vehicle 100 in accordance with the methods described herein, and enable the vehicle 100, its systems and occupants to communicate and/or exchange data and information with remote computers (e.g., computers on Earth and/or in orbit) and/or other devices.

In some embodiments, the vehicle 100 includes all of the systems necessary for implementing the mission sequences described herein. Such systems can include, for example, a communications system 193*a* for, e.g., wireless communications (including crew communications, digital communications between processing devices, etc.) between the vehicle 100 and, e.g., ground control, ground stations, orbiting stations, etc. The communication system 193*a* can include, for example, wireless transceivers, antennae, etc. for broadcasting transmissions to, and receiving transmissions from, remote locations. The vehicle systems can also include an electrical power and distribution system 193*b*; a navigation system 193*c*; a flight controls system 193*d* for affecting actuation of the vehicle control surfaces, engine throttles, landing gear, etc.; avionics 193*e*; a hydraulic system 193*f* for, e.g., control surface and landing gear actuation; and an environmental control system 193*g* for maintaining, e.g., air conditioning, etc. for human occupancy. The foregoing systems are non-exclusive, and it will be understood that some embodiments of the vehicle 100 can include other control and operating systems, while other embodiments of the vehicle 100 may not include one or more of these systems. Further details of the representative vehicle, including launching and landing operations, are described in co-pending PCT Application No. PCT/US2019/034003, filed on May 24, 2019, and incorporated herein by reference.

Figure 2:
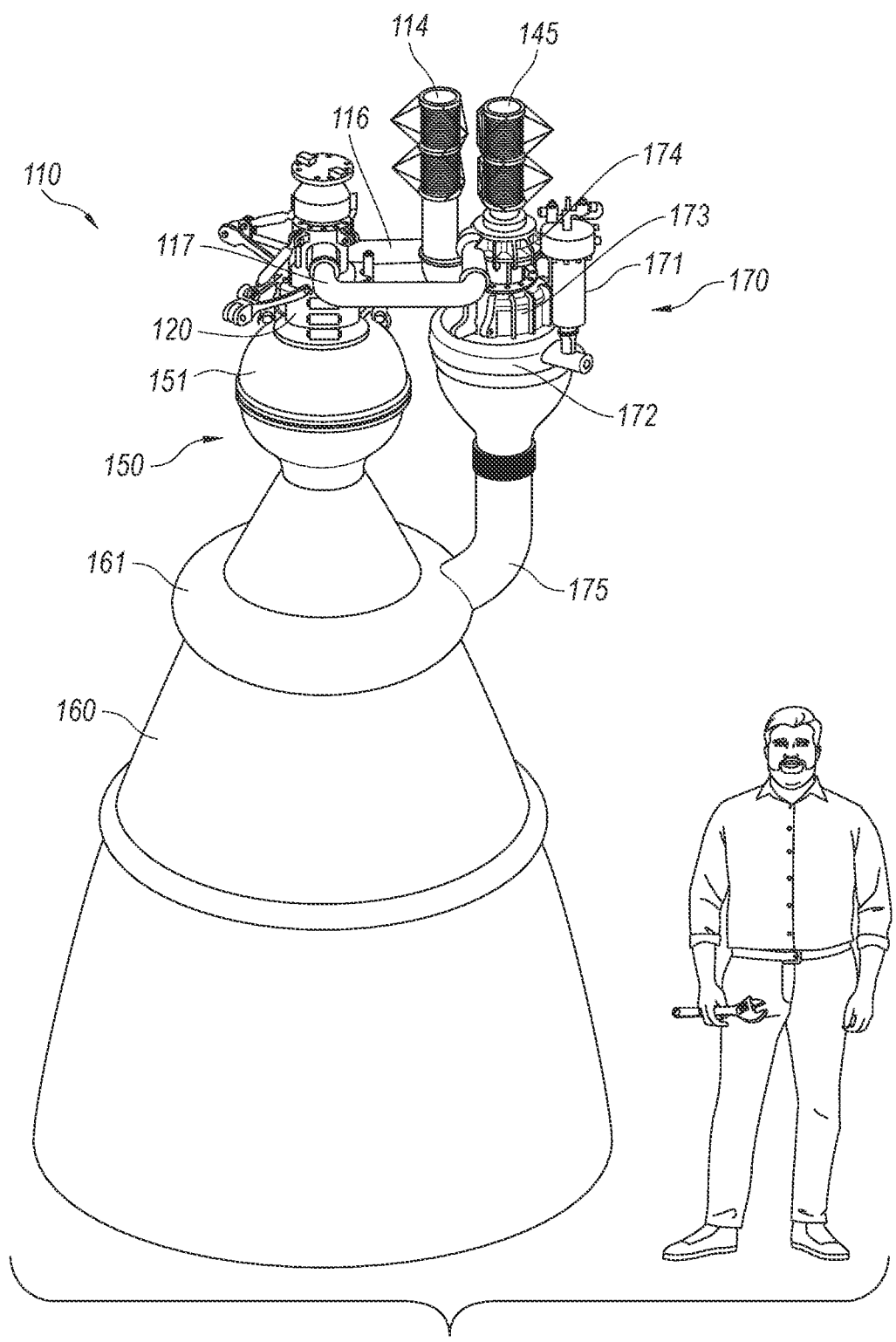
FIG. 2 is a partially schematic, side view of elements of a rocket propulsion system configured in accordance with embodiments of the present technology.

Elements of the propulsion system 110 are further illustrated in FIG. 2. The propulsion system 110 can include one or more main engines 150 (one is shown in FIG. 2), each of which can in turn include a combustion chamber 151 coupled to a nozzle 160. Propellant (e.g., fuel and oxidizer) is provided by a propellant supply system 170. The propellant supply system 170 can include a gas generator 171 which powers a turbine 172, which, in turn, powers a fuel pump 173 and an oxidizer pump 174. The fuel pump 173 receives fuel from a fuel supply line 114 and supplies the fuel to a propellant injector 120 via a pressurized fuel line 116. The oxidizer pump 174 receives oxidizer from an oxidizer supply line 115 and supplies the oxidizer to the propellant injector 120 via a pressurized oxidizer line 117. The propellant injector 120 (not clearly visible in FIG. 2 but described in further detail later) directs the propellants into the combustion chamber 151. The resulting exhaust products are directed through the nozzle 160 to provide thrust. Exhaust from the gas generator 171, which is typically cooler than the exhaust from the main engine nozzle 160, is directed to an exhaust injection manifold 161 via a turbine exhaust duct 175, to cool the walls of the nozzle 160.

In representative embodiments, the propellant includes Jet-A and the oxidizer includes liquid oxygen (LOX). In other embodiments, the engine 150 can burn other suitable propellants and/or propellant combinations. The operation of the propulsion system 110 is controlled by the automated (e.g., autonomous or semi-autonomous) controller 190 (FIG. 1).

Figure 3B:
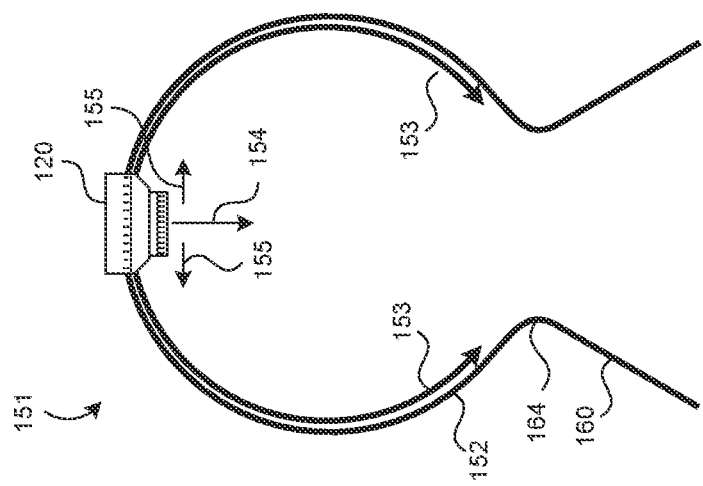
FIG. 3B is a partially schematic, cross-sectional view of a combustion chamber cooled in accordance with embodiments of the present technology.
Figure 3A:
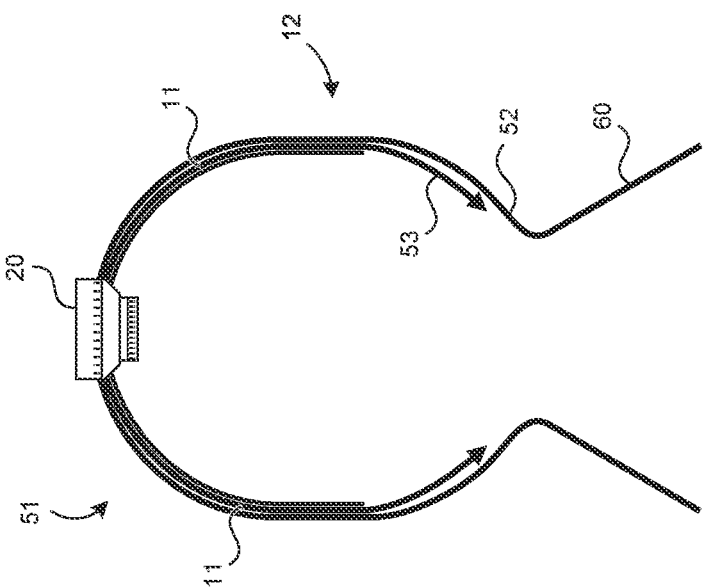
FIG. 3A is a partially schematic, cross-sectional view of a conventional rocket combustion chamber configured in accordance with the prior art.

FIG. 3A is a partially schematic, cross-sectional illustration of a conventional combustion chamber 51 and an associated nozzle 60, configured in accordance with the prior art. The combustion chamber 51 includes a propellant injector 20 that provides fuel and oxidizer to the combustion chamber 51. The combustion chamber 51 further includes chamber walls 52, that define a partially cylindrical central section 12 and partially hemispherical sections at each end. The chamber walls 52 are cooled by a fuel cooling flow 53 passing through associated cooling ducts 11 in the chamber walls 52.

One drawback associated with the cooling arrangement described above with reference to FIG. 3A is that the narrow cooling channels or ducts 11 add complexity to the manufacturing process for producing the combustion chamber 51. Another drawback associated with the foregoing cooling arrangement is that the cooling ducts 11 add weight. Still another drawback with the foregoing cooling arrangement is that the narrow cooling channels or ducts 11 can become clogged, for example, as a result of coking in the high temperature environment of the combustion chamber 51. Aspects of the presently disclosed technology can address, in whole or in part, the foregoing drawbacks.

FIG. 3B is a partially schematic, cross-sectional illustration of a combustion chamber 151 configured in accordance with representative embodiments of the present technology. In particular, the combustion chamber 151 can include chamber walls 152 that are spherical or nearly spherical in shape, rather than walls that include a cylindrical section 12, as shown in FIG. 3A. In addition, the propellant injector 120 can direct a fuel cooling flow 153 outwardly along the curved chamber walls 152, without the need for a cooling duct. Instead, the cooling flow 153 is delivered with sufficient momentum that it remains attached (in a fluid dynamic sense) to the chamber walls 152, as a result of centrifugal forces. By eliminating the need for cooling ducts, this arrangement can reduce the manufacturing complexity and weight of the combustion chamber 151.

In operation, the fuel cooling flow 153 can be delivered into the combustion chamber 151 at a high rate of speed (e.g., approximately 330 feet per second) and a force of approximately 3,570 g's, where one g is equal to the force of gravity at the Earth's surface. With this force, the fuel cooling flow 153 can remain attached to the chamber wall 152 throughout most of, or the entirety of, the combustion chamber 151, as the cooling flow 153 and combustion products proceed to the throat 164 of the nozzle 160. The thickness of the layer of fuel cooling flow 153 may change as the fuel cooling flow travels around the circumference of the combustion chamber 151. For example, the layer thickness can decrease as the flow travels outwardly from the injector 120 toward the "equator" of the combustion chamber 151 and increase as the flow travels inwardly toward the throat 164. In addition, as the fuel cooling flow 153 heats up, some of the flow may combust. However, in particular embodiments, the flow does not combust, and in fact passes through the throat 164 to provide further cooling to the downstream portions of the nozzle 160. For example, the ratio of fuel-to-oxidizer in the combustion chamber 151 can be fuel-rich, so that the amount of oxidizer is insufficient to combust the cooling flow 153, while still being sufficient to combust some or all of the main flow of fuel into the combustion chamber 151.

In some embodiments, the chamber wall 152 has an entirely spherical shape e.g., up to the point at which the chamber wall 152 transitions to the throat 164. It is expected that, with this shape, the fuel cooling flow 153 will not separate from the chamber wall 152 as it travels from the propellant injector 120 to the throat 164. In some arrangements, the chamber wall 152 may not be entirely spherical, and may include non-spherical portions or contours. However, in such instances, the non-spherical portions are sized so as to be short enough not to cause the fuel cooling flow 153 to separate as it travels along the chamber wall 152.

In addition to directing the fuel cooling flow 153, the propellant injector 120 directs a main fuel flow 154 and a main oxidizer flow 155 into the combustion chamber 151 where the flows mix, combust (e.g., in a combustion zone within the combustion chamber), and exit through the nozzle 160. Further details of a representative propellant injector 120 are described below with reference to FIGS. 4A-6B.

FIG. 4A is a partially schematic, cross-sectional view of a representative propellant injector 120 (e.g., a coaxial propellant injector), configured in accordance with embodiments of the present technology. The propellant injector 120 includes an injector housing 121 that is attached to, or integrally formed with, the combustion chamber 151. The propellant injector 120 further includes an injector body 122 which carries a fuel distributor, e.g., a fuel metering ring or spray ring 123 and an oxidizer distributor 124, e.g., a pintle tip 124a. A fuel piston 128 and oxidizer piston 129 direct fuel and oxidizer, respectively, to the fuel metering ring 123 and to the oxidizer distributor 124, respectively. The oxidizer piston 129 has an annular, cylindrical shape, with a channel extending upwardly within the cylindrical wall from a downwardly-facing open end. The fuel piston 128 has an annular, cylindrical shape and fits within the channel of the oxidizer piston 129, as will be described in further detail below with reference to FIGS. 5A and 5B. The two pistons 128, 129 can move relative to each other to coordinate the order in which fuel and oxidizer are delivered into the combustion chamber 151. The fuel is provided to the propellant injector 120 via a fuel manifold 126 and fuel inlet ports 127. The oxidizer is provided to the propellant injector 120 via an oxidizer inlet 125.

FIG. 4B is an enlarged, partially schematic, cut-away illustration of the injector body 122 and internal components. As shown in FIG. 4B, the pintle tip 124a can be attached to the injector body 122 at a threaded connection (or other suitable connection) 133. The pintle tip 124a includes a main oxidizer outlet (e.g., including oxidizer outlet orifices) 132 that distributes and directs the flow of oxidizer into the combustion chamber 151 (FIG. 4A). The fuel metering ring 123 includes fuel cooling flow orifices 131 that direct the fuel cooling flow along the walls of the combustion chamber 151, as described above with reference to FIG. 3B. The fuel metering ring 123 further includes a main fuel outlet 130 that directs the main flow of fuel into the combustion chamber 151. The fuel piston 128 opens the flow of fuel to the fuel metering ring 123, and the oxidizer piston 129 opens the flow of oxidizer from the pintle tip 124a. A piston actuator port 136 provides an actuating fluid 137 (e.g., nitrogen or another inert fluid) that keeps the pistons 128, 129 in a normally closed position. When the fluid pressure at the piston actuator port 136 is reduced, the pistons 128, 129 open to the positions shown in FIGS. 4A and 4B, as will be described in further detail below with reference to FIGS. 5A and 5B.

Figure 5A:
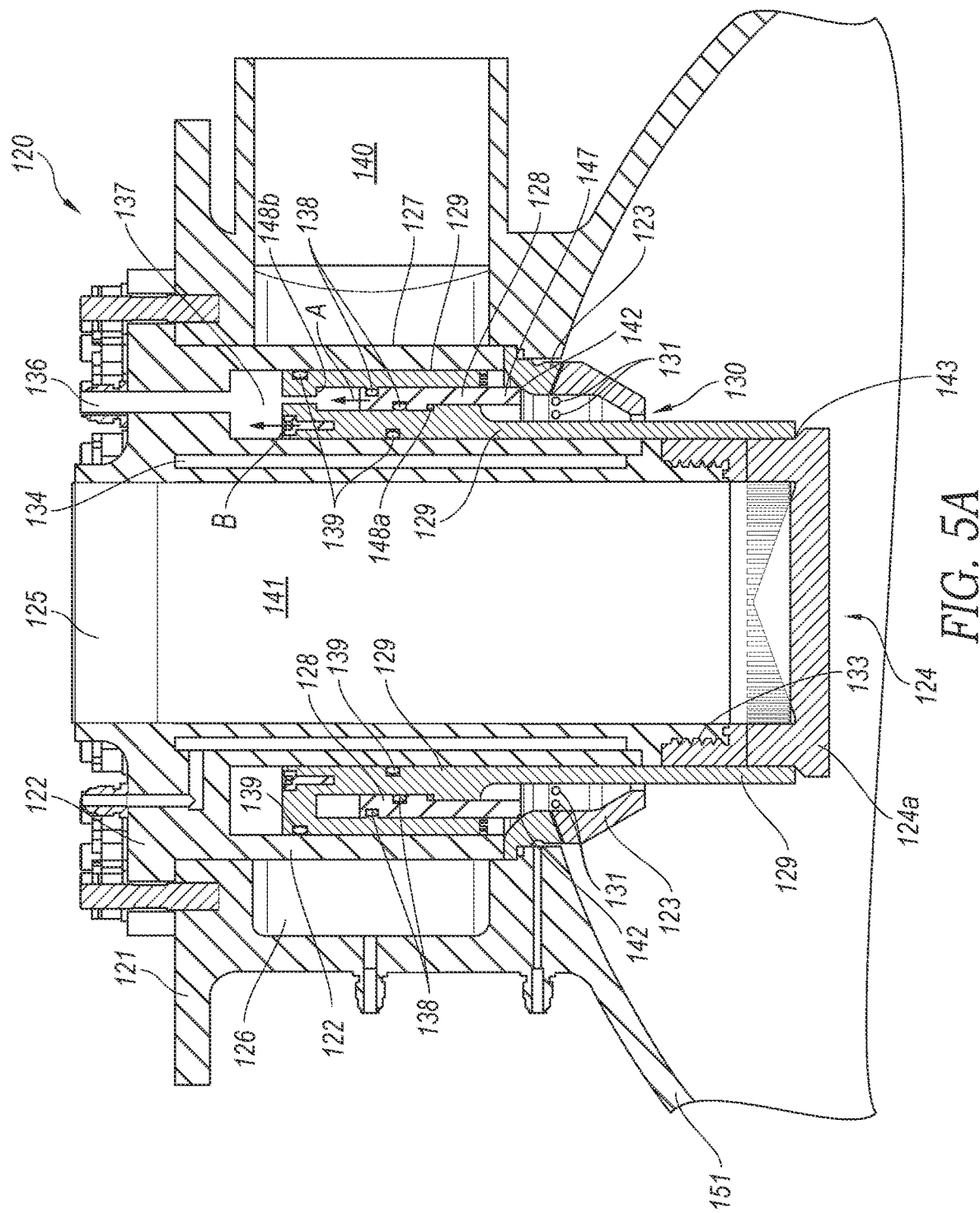
FIGS. 5A and 5B are partially schematic, cross-sectional illustrations of a representative injector shown in a closed position (FIG. 5A) and an open position (FIG. 5B), in accordance with embodiments of the present technology.

FIG. 5A is a partially schematic, cross-sectional illustration of the injector 120 in a closed position or configuration. In this position, the pressure provided by the actuating fluid 137 forces the fuel piston 128 downwardly so that it engages with the fuel metering ring 123 and forms a metal-to-metal fuel seal 142. For example, the fuel piston 128 can be formed from stainless steel and the fuel metering ring 123 can be formed from a softer metal (e.g., copper and/or copper alloys, including glidcop) which deforms slightly to form the fuel seal 142. Accordingly, while fuel 140 may pass through the circumferentially-spaced fuel inlet ports 127 (also shown in FIG. 4B), the fuel piston 128 and the fuel seal 142 prevent the fuel 140 from flowing to and through the fuel cooling flow orifices 131 and the main fuel outlet 130.

The fuel piston 128 includes fuel piston seals 138 that slidably engage with an internal cavity of the oxidizer piston 129. When the fuel piston 128 is forced downwardly to its closed position (e.g., under the force of the actuating fluid 137), as shown in FIG. 5A, it bears against an upwardly facing internal surface 148a of the oxidizer piston 129 and forces the oxidizer piston 129 downwardly against the pintle tip 124a so that the oxidizer piston 129 forms a metal-to-metal oxidizer seal 143 with the pintle tip 124a of the oxidizer distributor 124. The oxidizer piston 129 can be formed from stainless steel and/or another suitable material, and the pintle tip 124a can be formed from glidcop or another suitable (and softer) high temperature material. The oxidizer piston 129 includes oxidizer piston seals 139 that slidably seal the oxidizer piston 129 against the internal surfaces of the injector body 122. The injector body 122 can include one or more insulating channels 134 to prevent cryogenic oxidizer from freezing the fuel as it flows from the fuel inlet 140 into the fuel manifold 126 through the fuel inlet ports 127 and out of the fuel metering ring main fuel outlet 130 and fuel cooling flow orifices 131.

When the pressure provided by the actuating fluid 137 is reduced, the force of the fuel 140 on the outer ring of the oxidizer piston 129 forces the oxidizer piston upward as indicated by arrow B, which lifts the fuel piston 128 as it bears against the upwardly facing internal surface 148a, as indicated by arrow A. When the oxidizer piston 129 lifts, the oxidizer seal 143 unseats, and the oxidizer 141 flows outwardly through the oxidizer outlet orifices 132 in the pintle tip 124a so that oxidizer enters the chamber ahead of the fuel. As the fuel piston 128 moves upwardly, the fuel 140 flows to the fuel cooling flow orifices 131 and the main fuel outlet 130. When the oxidizer piston 129 reaches its maximum upward position, the fuel piston 128 continues to move upwardly until it engages a downwardly facing surface 148b of the oxidizer piston 129, at which point the fuel inlet ports 127 (visible in FIGS. 4A, 4B and 5B) are exposed to allow fuel to flow therethrough.

Because the oxidizer piston 129 opens before the fuel piston 128 opens, the combustion process in the combustion chamber 151 can be initiated in a smoother manner. Accordingly, this approach can improve the combustion chamber performance.

Figure 5B:
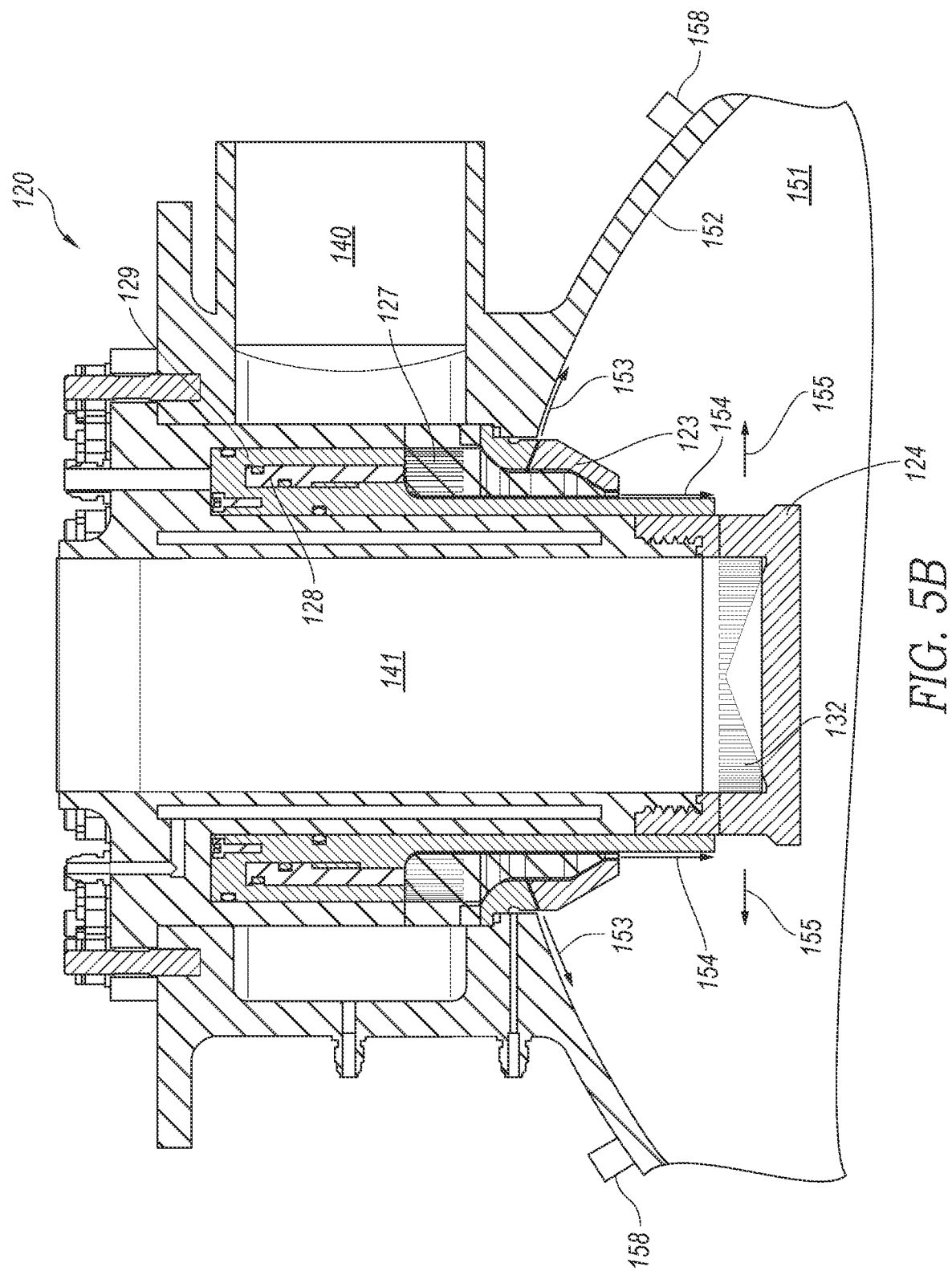

FIG. 5B illustrates the propellant injector 120 in the fully open position. In this position, both the fuel piston 128 and the oxidizer piston 129 have lifted, allowing the fuel cooling flow 153, the main fuel flow 154, and the main oxidizer flow 155 to enter the combustion chamber 151. As described above, the fuel cooling flow 153 proceeds along the chamber wall 152 under centrifugal force to cool the chamber wall 152. The main oxidizer flow 155 is directed radially outwardly (e.g., generally in the form of a spray), and the main fuel flow 154 is directed downwardly (e.g., generally in the form of an annular cylinder) through the main oxidizer flow 155. The main fuel flow 154 and the main oxidizer flow 155 mix and travel downwardly and outwardly into the combustion chamber 151, where they are ignited by igniters 158 (shown schematically in FIG. 5B), and combusted.

Figure 6A:
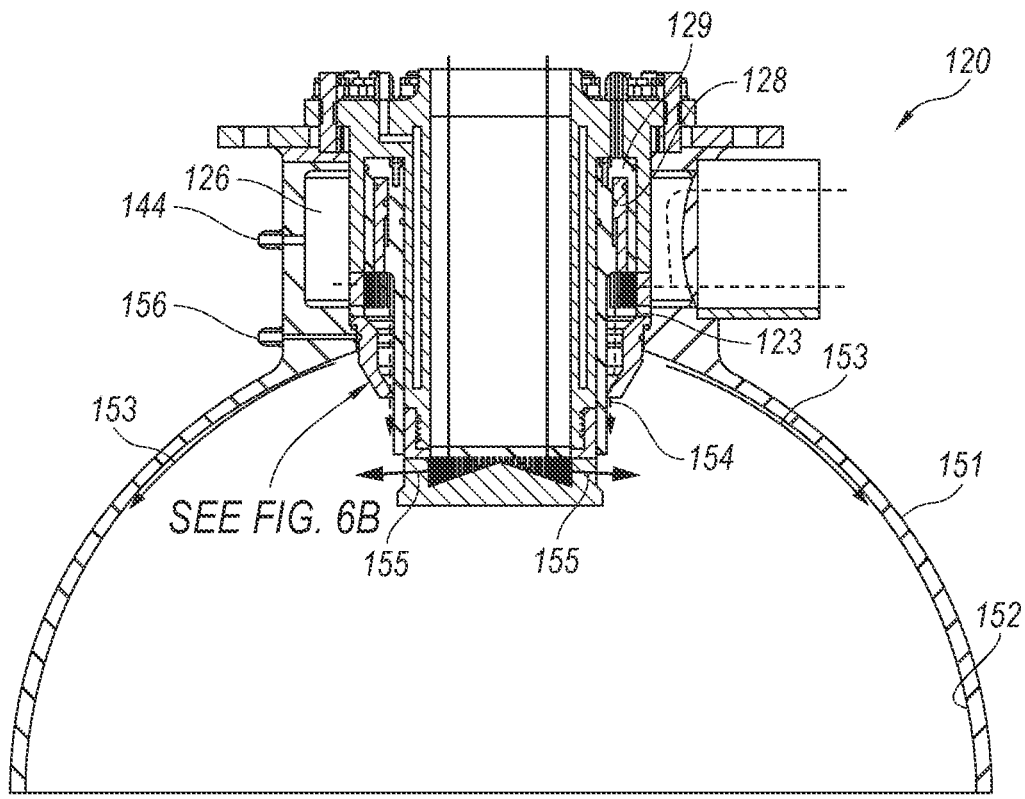
FIG. 6A is a partially schematic cross-sectional view of a representative injector shown in an open position in accordance with embodiments of the present technology.

FIG. 6A is an additional illustration of the fuel and oxidizer flows when the propellant injector 120 is in the open position. As is also shown in FIG. 6A, a fuel pressure port 144 is used to measure the fuel pressure in the fuel manifold 126, and a combustion chamber pressure port 156 is used to measure the static pressure in the combustion chamber 151.

Figure 6B:
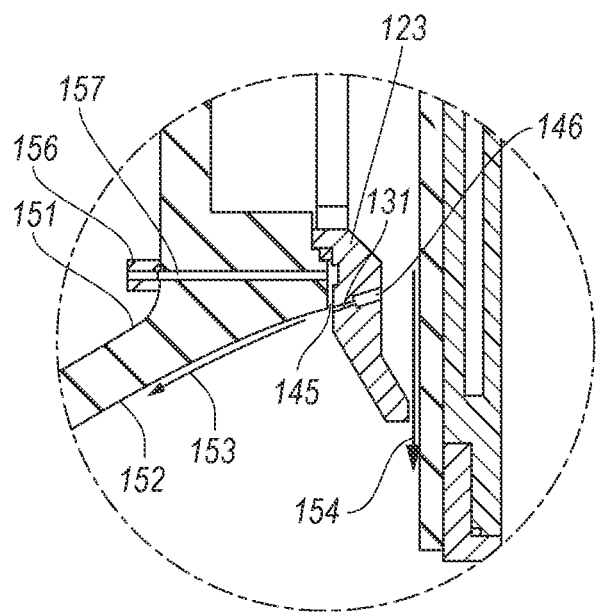
FIG. 6B is an enlarged cross-sectional view of a portion of the injector and combustion chamber shown in FIG. 6A.

FIG. 6B is an enlarged illustration of the region around the combustion chamber pressure port 156. The combustion chamber pressure port 156 is connected to a combustion chamber port channel 157, which communicates with the interior of the combustion chamber 151, e.g., via a small gap 145. The fuel cooling flow 153 is directed tangentially along the chamber wall 152, transverse to the gap 145. The fuel cooling flow 153 exits through the fuel cooling flow orifices 131, which receive fuel from a cooling flow capture slot 146. Accordingly, a small portion of the main fuel flow 154 is diverted through the fuel cooling flow orifices 131.

Figure 7A:
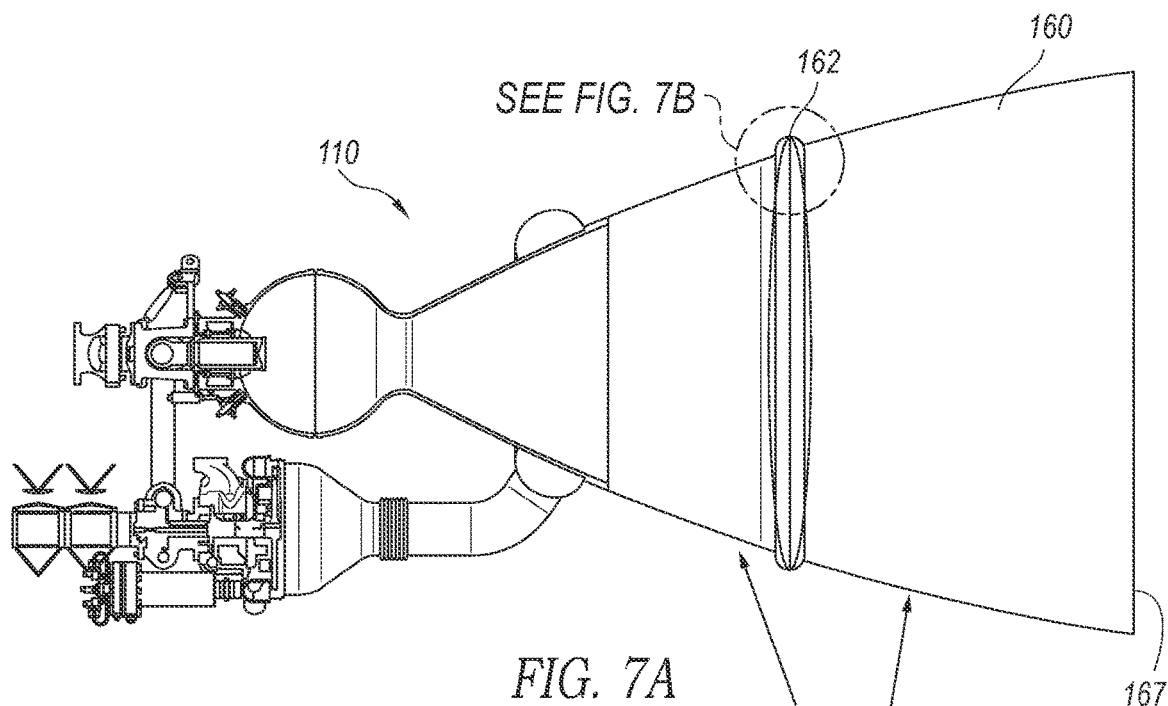
FIG. 7A is a partially schematic illustration of a representative propulsion system configured in accordance with embodiments of the present technology.
Figure 7B:
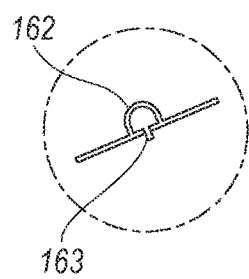
FIGS. 7B and 7C illustrate representative injection ports configured in accordance with embodiments of the present technology.
Figure 7C:
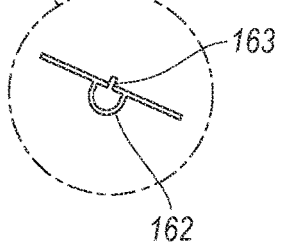

FIG. 7A is a schematic illustration of the representative propulsion system 110, illustrating the nozzle 160, which has an exit 167 and an injection port manifold 162. FIGS. 7B and 7C illustrate further details of the injection port manifold 162 (which is positioned around the circumference of the nozzle 160), and associated injection ports. In particular, FIG. 7B illustrates representative injection ports 163 that are positioned around the circumference of the nozzle 160 and receive fluid from the injection port manifold 162. FIG. 7C indicates that the injection port manifold 162 and associated injection ports 163 can be located upstream and/or downstream of the axial position shown in FIG. 7A, in addition to, or in lieu of the position shown in FIG. 7A.

Figure 7D:
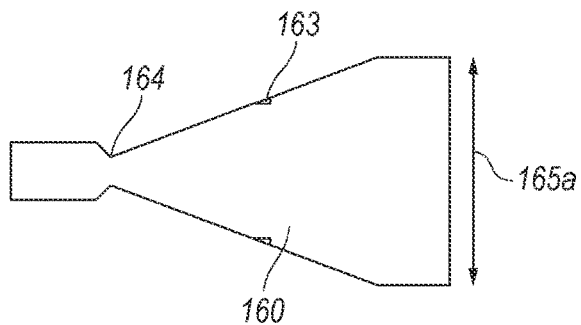
FIGS. 7D and 7E schematically illustrate a representative nozzle with fluid injection ports inactive (FIG. 7D) and active (FIG. 7E) in accordance with embodiments of the present technology.

In any of the embodiments described above with reference to FIGS. 7A-7C, the injection ports 163 can operate (e.g., under the control of the controller 190, described above with reference to FIG. 1) in the manner shown and described below with reference to FIG. 7D and FIG. 7E. Referring first to FIG. 7D, when the injection ports 163 are inactive, the exhaust flow occupies the entire cross-sectional exit area of the nozzle 160, producing a first effective nozzle area 165a. The area ratio of the first effective nozzle area 165a to the area at the nozzle throat 164 can be relatively large, which is suitable for high altitude performance. For example, the area ratio can be about 60:1.

Figure 7E:
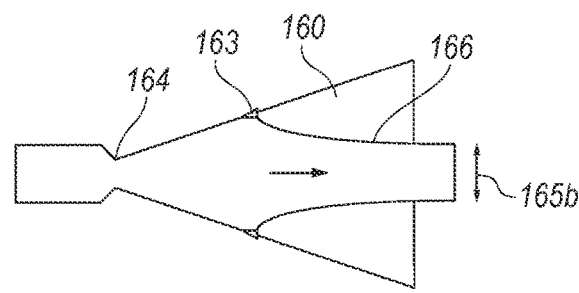

Referring next to FIG. 7E, when the injection ports 163 are activated, the flow from the injection ports 163 is directed transverse to the inner wall of the nozzle and transverse to the flow direction of exhaust products passing through the nozzle. Accordingly, the injected flow trips the exhaust flow and produces a shockwave 166 that limits the effective flow over of the nozzle 160 to a smaller, second effective nozzle area 165b. The area ratio of the second effective nozzle area 165b to the area at the nozzle throat 164 can be significantly lower than what is shown in FIG. 7D, for example, an area ratio of 33:1. Accordingly, since the nozzle flow is typically overexpanded at low altitude (as a compromise to improve high altitude performance), absent the flow area reduction effect shown in FIG. 7E, the nozzle exit area reduction provided by the tripped exhaust flow can improve the nozzle efficiency at low altitude. The result is a dual area ratio engine, which can have at least two effective area ratios as shown in FIGS. 7D and 7E. By varying the flow injection location (as described above with reference to FIG. 7C), the area ratio can be varied over more than two values.

In any of the foregoing embodiments, the fluid injected into the nozzle can be inert (e.g., obtained from an on-board nitrogen bottle, or other suitable source) or, in some embodiments, can be combustible. Combustible injected fuel can provide additional thrust, in addition to providing the effective area reduction effect described above.

Figure 8:
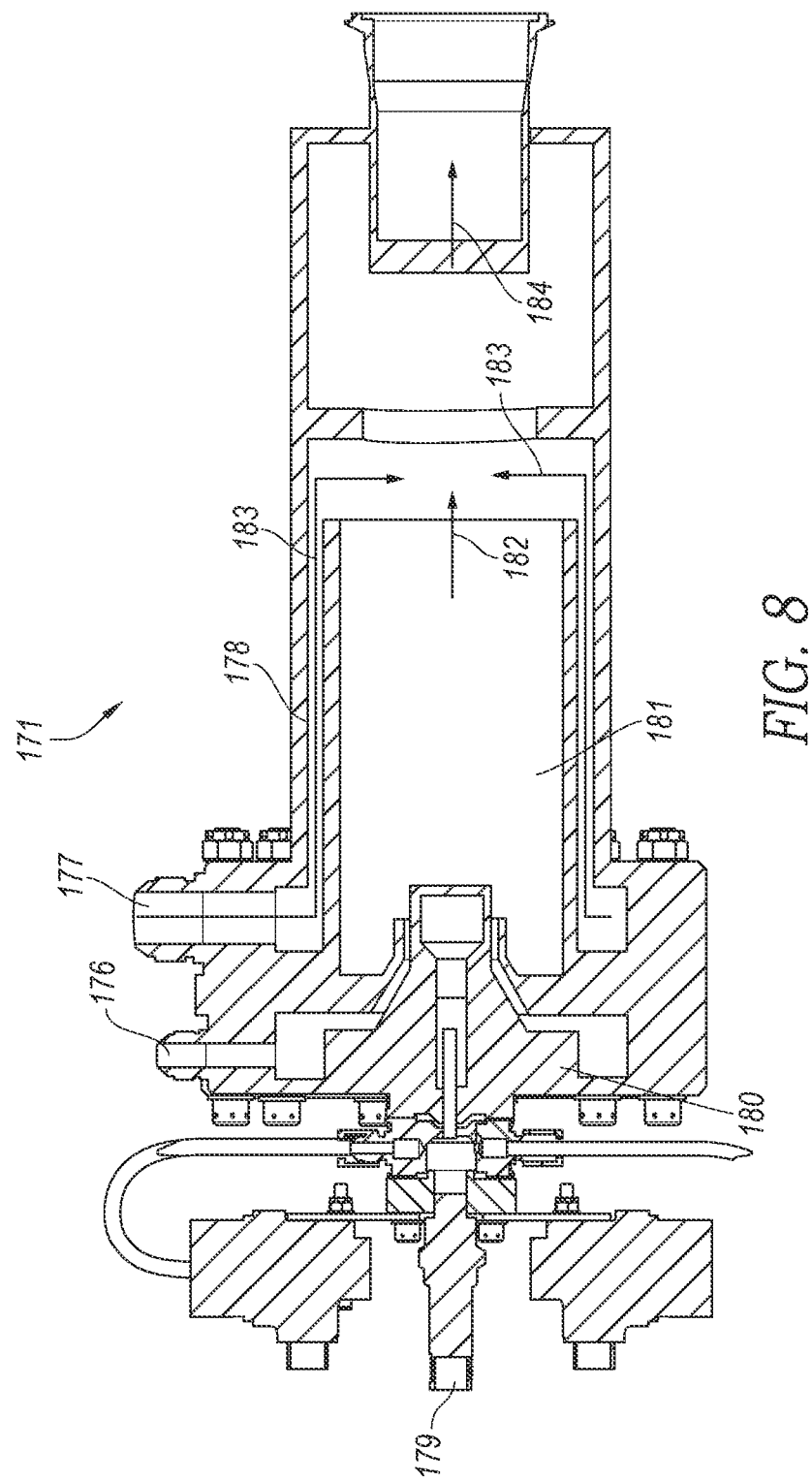
FIG. 8 is a partially schematic, cross-sectional illustration of a fuel-cooled gas generator configured in accordance with embodiments of the present technology.

FIG. 8 is a partially schematic, cross-sectional illustration of a representative gas generator 171 configured in accordance with embodiments of the present technology. The gas generator 171 can include a combustion chamber 181 that receives fuel and oxidizer via an injector 180, which in turn receives fuel via a main fuel inlet 176 and oxidizer via an oxidizer inlet 179. The combustion chamber 181 can be cooled via a coolant channel 178 that receives fuel via a fuel coolant inlet 177. The resulting coolant flow 183 is directed around the combustion chamber 181 to cool the combustion chamber 181. The exiting coolant flow 183 can mix with the exiting exhaust products 182 to produce an exhaust products/coolant flow mixture 184 that exits the gas generator 171. This flow can then be introduced into the main engine nozzle 160 via the turbine exhaust duct 175 and exhaust injection manifold 161, shown in FIGS. 2 and 7A. Accordingly, the flow mixture 184 can be fuel-rich, with a significant amount of unburned fuel, to cool the main engine nozzle 160.

The propulsion system 110 shown in FIG. 2 receives fuel and oxidizer from corresponding fuel and oxidizer tanks. FIGS. 9A-10B describe representative fuel and oxidizer tanks, and techniques for managing the pressures within the tanks.

Figure 9B:
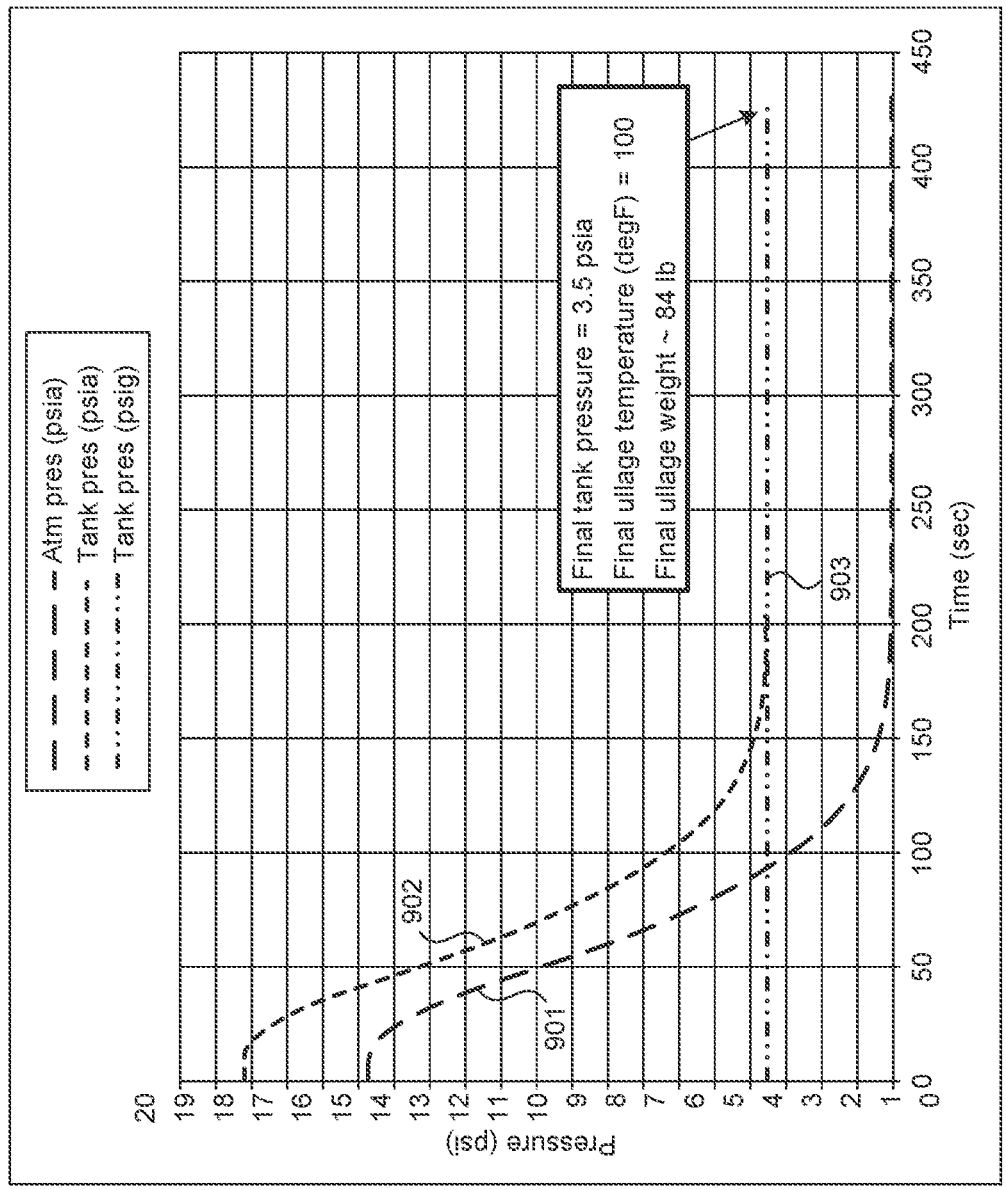
FIGS. 9A and 9B illustrate a representative oxidizer tank and associated pressure curves as a function of time during operation in accordance with embodiments of the present technology.
Figure 9A:
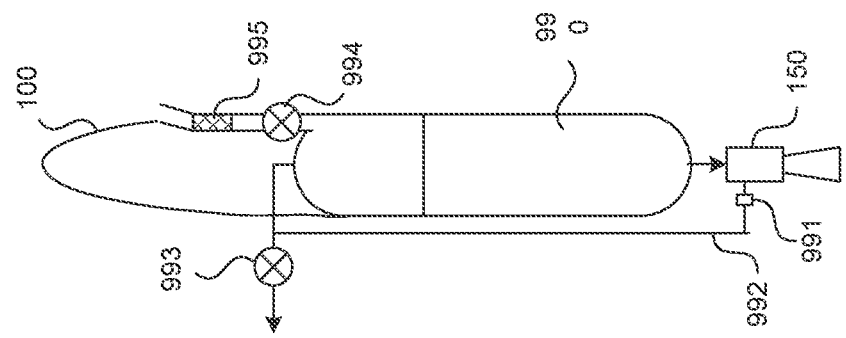

FIG. 9A illustrates a representative oxidizer (or oxidant) tank 990 that supplies oxidizer (e.g., liquid oxygen) to the engine 150. The engine 150 can be coupled to a heat exchanger 991 to heat a separate flow of unburned oxidizer, creating a flow of vaporized oxidizer 992 which is delivered into the oxidizer tank 990, thus pressurizing it. An exit vent 993 is configured to vent the oxidizer tank 990 when the pressure differential across the walls of the oxidizer tank 990 exceeds a threshold value, for example, about 3.5 psi. An entry vent 994 is configured to allow air to enter the oxidizer tank 990 as the vehicle descends through the atmosphere, to prevent the oxidizer tank 990 from collapsing under atmospheric pressure. The entry vent 994 can include a desiccant 995 that prevents or restricts moisture from entering the oxidizer tank 990 as air enters the tank during reentry.

FIG. 9B is a graph illustrating several pressure values as a function of time during vehicle ascent. For example, line 901 illustrates the pressure outside the vehicle as it ascends from the Earth's surface beyond the atmosphere. Line 902 illustrates the absolute pressure within the oxidizer tank 990 as the vehicle ascends. Line 903 illustrates the gauge pressure or relative pressure within the tank as the vehicle ascends. As shown by line 903, the relative pressure within the oxidizer tank 990 remains at about 3.5 psig throughout the ascent of the vehicle. During descent, the entry vent 994 and exit vent 993 can operate to maintain the pressure within the oxidizer tank 990 at 3.5 psig during descent as well. The exit vent 993 and/or the entry vent 994 can respond passively to pressure changes (e.g., via springs) or can respond actively (e.g., via solenoids or other actuators coupled to pressure sensors).

Figure 10B:
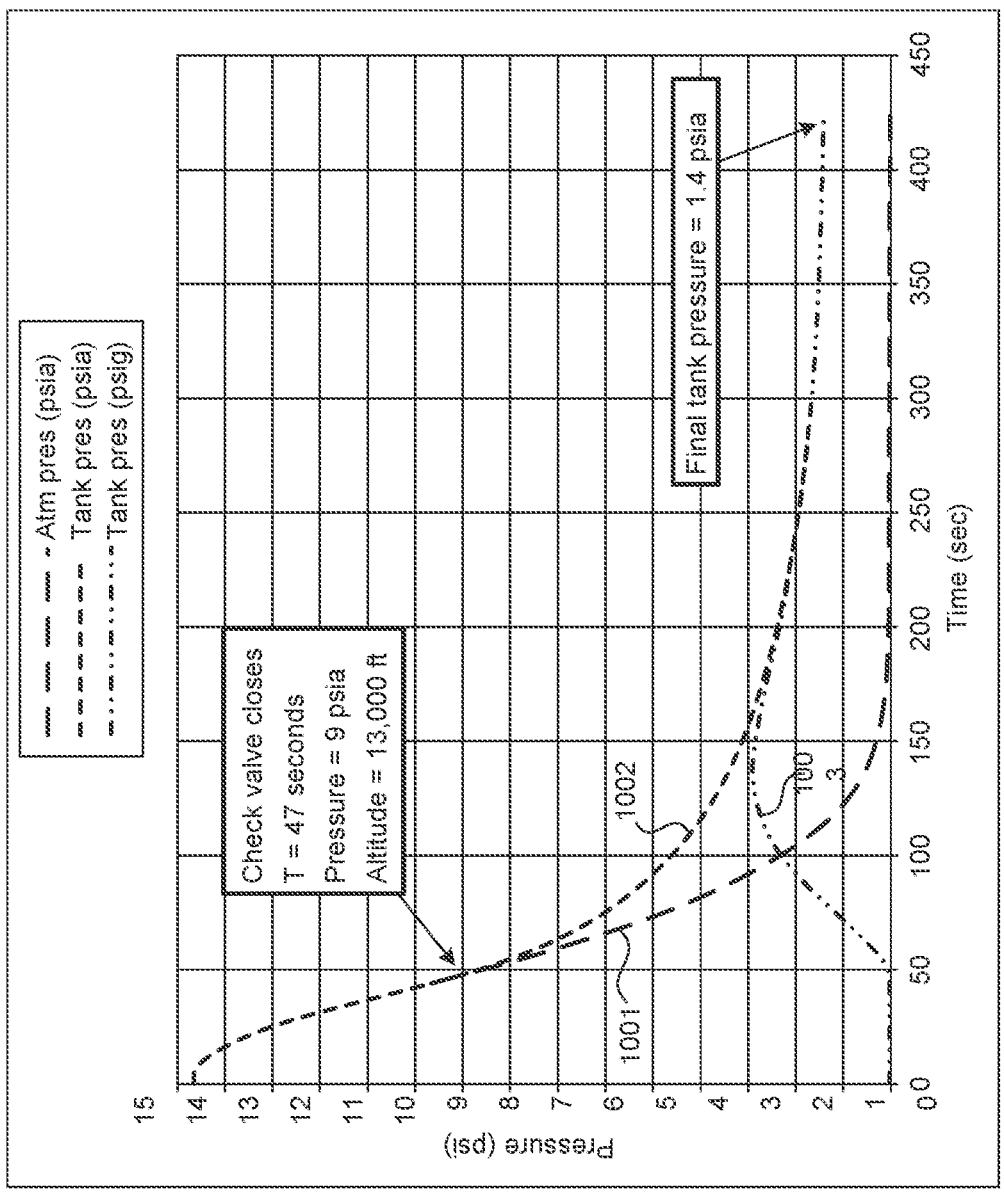
FIGS. 10A and 10B illustrate a representative fuel tank and associated pressure curves as a function of time during operation in accordance with embodiments of the present technology.
Figure 10A:
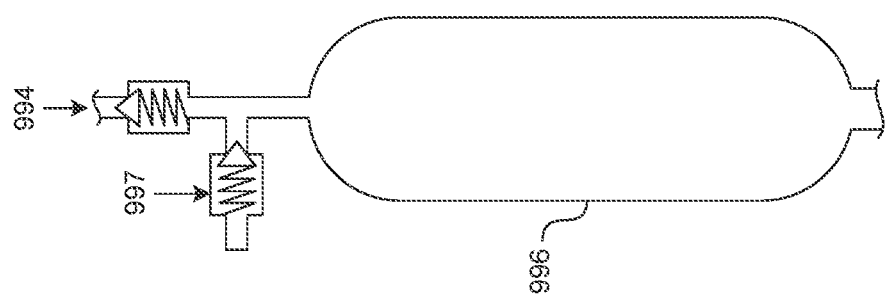

FIG. 10A is a schematic illustration of a representative fuel tank 996, which is coupled to an entry vent 994 and a check valve 997. FIG. 10B illustrates various pressure values as a function of time during the vehicle's ascent. Referring to FIGS. 10A and 10B together, line 1001 illustrates the atmospheric pressure as a function of time during vehicle ascent, line 1002 illustrates the absolute pressure within the fuel tank 996, and line 1003 illustrates the differential pressure within the fuel tank 996. The fuel within the fuel tank 996 is unpressurized at launch. During ascent, the check valve 997 can close at a preselected value (e.g., 9 psia, corresponding to a non-zero altitude, e.g., 13,000 feet). The pressure within the fuel tank 996 will continue to decrease as fuel is consumed, but the relative pressure within the tank does not exceed a preselected value (e.g., about 3 psig). During vehicle descent, the entry vent 994 can be configured to release at a pressure difference of about 1 psig so that the fuel tank internal pressure tracks the atmospheric pressure during descent. As described above in the context of the oxidizer tank 990, the fuel tank valves and vents can respond actively or passively to pressure changes.

For purposes of illustration, the oxidizer tank 990 and the fuel tank 996 are shown as cylindrical. In particular designs, however, these propellant tanks have conformal shapes that allow them to be placed within the wings 104a, 104b, the fuselage 102, and/or other non-cylindrical structures of the vehicle 100 shown in FIG. 1. As described above, the propellants for the vehicle can include liquid oxygen (LOX) and Jet-A, both of which are abundant and relatively inexpensive. Jet-A has a naturally low vapor pressure across the operating conditions of the vehicle 100, which can allow it to be stored in tanks of virtually any shape. However, oxygen is gaseous across the vehicle 100 operating conditions, and is normally a liquid only at temperatures below its natural boiling point of −297° F. Because oxygen boils at such a low temperature, it has a high vapor pressure across the vehicle operating range and, conventionally, is kept in heavy, thick-walled, rounded or cylindrical tanks capable of withstanding higher pressures (e.g., greater than 20 psig).

By contrast, the LOX used for vehicles in accordance with the present technology is sufficiently cold that the vapor pressure is relatively low (e.g., less than 4 psig). For example, the LOX can be cooled from its normal boiling point (NBP) of −297° F. to −320° F. (liquid nitrogen temperature) to achieve a 5% increase in density and a 9% increase in heat sink capacity. This low vapor pressure can allow the LOX tank to have a conformal shape and therefore fit within the vehicle wing. For example, the internal structure of the wing can be wetted so that the wing itself forms a LOX tank. This approach improves aerodynamic and structural efficiency, enabling the use of lighter-weight composite materials, for example, because the tanks can support flight loads without requiring a pressure-stabilized design. The ability to shape the LOX tank over a much wider variety of conformal shapes, with reduced wall thickness, allows the vehicle to carry a greater amount of LOX per unit volume, thereby improving the mass fraction of the vehicle.

In operation, the LOX can be stored at a low vapor pressure, e.g., in some embodiments, to produce a pressure differential across the LOX tank walls and bulkheads of less than 3 psig. The tank pressures can be maintained at 2-3.5 psig during ascent to prevent boiling, and can be vented to prevent tank buckling during descent, as described above. Before take-off, the propellant tanks are pressurized on the ground using ground-based resources. As discussed above, once aloft, the tanks can be pressurized using vaporized propellant gasses supplied from heat exchangers coupled to the main engine. Once in orbit, residual ullage gases can vent through the exit vent 993 (FIG. 9A). Because the LOX is stored at such a low pressure, the overall system can include a boost pump that increases the LOX pressure (e.g., to approximately 40 psia) to meet the inlet requirements of the oxidizer pump 174 described above with reference to FIG. 2. The fuel, though not at as low of a pressure as the LOX, can also include a boost pump to provide consistent inlet conditions with the turbine-driven fuel pump 173 (FIG. 2). Both the fuel and the oxidizer boost pumps can include an impeller/inducer combination and can have a partial emission or full emission design, with an inducer. The pumps can be driven through a shaft connected to an electric motor or a turbine.

As described above, the propellant system can be sized and configured to manage and reduce pressure differentials across the walls of the associated propellant tanks. This in turn can allow the tanks to be made conformal with the vehicle, which improves the structural efficiency of the vehicle, and the propellant capacity of the vehicle.

Other features of the vehicle described above, which can be used singly or in combination, can produce further benefits. For example, the combustion chamber cooling design, described above, can eliminate the need for the typical multitude of small cooling channels, which are susceptible to clogging, increase the weight of the vehicle, and increase the complexity of the vehicle manufacturing process. By reducing or eliminating the likelihood for the fuel to clog, embodiments of the present technology can use less refined fuel (e.g., Jet-A rather than RP-1) to improve system flexibility and reduce cost. Embodiments of the present technology that include injectors having the configurations described above can facilitate fuel cooling flow injection, in addition to providing a simple design for both the cooling flow and the main propellant flows.

From the foregoing, it will be appreciated that specific embodiments of the disclosed technology have been described herein for purposes of illustration, but that various modifications may be made without deviating from the technology. For example, the overall vehicle can have configurations other than those specifically illustrated in the foregoing Figures. The propellants used for the vehicle can, in some embodiments, be different than liquid oxygen and/or Jet-A. For example, the propellant can include RP-1 (assuming costs and/or other factors associated with the additional refining of RP-1 are acceptable), and/or other kerosenes. In other examples, the propellant can include liquid natural gas (LNG), compressed natural gas (CNG) and/or other methane-based fuels. Certain aspects of the technology described in the context of particular embodiments may be combined or eliminated in other embodiments. For example, an individual vehicle can include any one or combination of the foregoing subsystems, depending upon the particular application. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

As used herein, the term "and/or", as in "A and/or B" refers to a alone, b alone, and both a and b. To the extent any materials incorporated herein by reference conflict with the present disclosure, the present disclosure controls. The following examples provide additional embodiments of the present technology.

EXAMPLES

1. A rocket propulsion system, comprising:
  a combustion chamber having an inwardly-facing chamber wall enclosing a combustion zone, the chamber having generally spherical shape with the chamber wall exposed to the combustion zone; and
  a propellant injector coupled to the combustion chamber and having at least one fuel injector nozzle positioned to direct a flow of cooling fuel outwardly to and along the inwardly-facing chamber wall.

2. The system of example 1, wherein the at least one fuel injector nozzle includes a spray ring, and wherein the system further comprises an engine nozzle positioned downstream of the combustion chamber to receive combustion products produced in the combustion zone.

3. The system of any preceding example wherein the chamber wall does not include cooling flow channels.

4. The system of any preceding example wherein the at least one fuel injector nozzle is positioned to direct fuel tangentially along the inwardly-facing chamber wall.

5. The system of any preceding example wherein the propellent injector further includes at least one fuel outlet positioned to direct a portion of fuel axially into the combustion chamber.

6. The system of example 5 wherein the propellant injector further includes at least one oxidizer outlet positioned to direct oxidizer outwardly into the combustion chamber, transverse to the portion of fuel directed axially into the combustion chamber.

7. A rocket propulsion system, comprising
a combustion chamber; and
a propellant injector coupled to the combustion chamber, and including:
an oxidizer inlet;
an oxidizer distributor in fluid communication with the oxidizer inlet;
a fuel inlet;
a fuel distributor in fluid communication with the fuel inlet;
a fuel piston movably positioned between the fuel inlet and the fuel distributor;
an oxidizer piston movably positioned between the oxidizer inlet and the oxidizer distributor, and positioned to open an oxidizer flow path between the oxidizer inlet and the oxidizer distributor before the fuel piston opens a fuel flow path between the fuel inlet and the fuel distributor.

8. The system of example 7 wherein the fuel piston is slidable relative to the oxidizer piston.

9. The system of example 7 wherein the fuel piston and the oxidizer piston each have an annular shape, and wherein the fuel piston is positioned within an annulus of the oxidizer piston.

10. The system of example 9, further comprising a piston actuator port in fluid communication with the fuel piston and the oxidizer piston.

11. The system of example 10 wherein the fuel piston is positioned to engage a first surface of the oxidizer piston to drive both the fuel piston and the oxidizer piston to respective closed positions when a pressure at the actuator port is at a first level, and wherein the fuel piston and the oxidizer piston move relative to each other to respective open positions when a pressure at the actuator port is at a second level less than the first level.

12. The system of example 7 wherein the oxidizer distributer includes a plurality of oxidizer outlet orifices positioned to direct a spray of oxidizer radially outwardly, and wherein the fuel distributer includes a fuel outlet positioned to direct a cylindrical flow of fuel transversely to and through the spray of oxidizer.

13. The system of example 7 wherein the propellant injector includes:
cooling flow orifices positioned to direct a first portion fuel tangentially along an inner wall of the combustion chamber
a fuel flow outlet positioned to direct a second portion of fuel axially into the combustion chamber; and
an oxidizer outlet positioned to direct oxidizer outwardly into the combustion chamber, transverse to the second portion of fuel.

14. The system of example 7, further comprising:
an exhaust nozzle coupled to the combustion chamber, the exhaust nozzle having a throat and an exit downstream of the throat, the exit having an exit cross-sectional area, the nozzle further including a plurality of injection ports positioned to direct an injected flow transverse to an inner wall of the nozzle; and
a controller operatively coupled to the injection ports to (a) direct injection of a fluid through the injection ports to reduce an effective cross-sectional area of the nozzle for operation at a first altitude, and (b) cease injection of the fluid at a second altitude greater than the first altitude.

15. A reusable space vehicle system, comprising:
a reusable horizontal takeoff/horizontal landing (HTHL), ground-assisted single-stage-to-orbit (SSTO) spaceplane; and
a rocket propulsion system, carried by the spaceplane, and including:
a combustion chamber having an inwardly-facing chamber wall enclosing a combustion zone, the chamber having generally spherical shape with the chamber wall exposed to the combustion zone; and
a propellant injector coupled to the combustion chamber and having at least one fuel injector nozzle positioned to direct a flow of cooling fuel outwardly along the inwardly-facing chamber wall.

16. The system of example 15 wherein the chamber wall does not include cooling flow channels.

17. The system of any of examples 15-16 wherein the at least one fuel injector nozzle is spaced apart from the inwardly-facing chamber wall.

18. The system of any of examples 15-17 wherein the propellent injector further includes:
at least one fuel outlet positioned to direct a portion of fuel axially into the combustion chamber; and
at least one oxidizer outlet positioned to direct oxidizer outwardly into the combustion chamber, transverse to the portion of fuel directed axially into the combustion chamber.

19. The system of any of examples 15-18 wherein the propellant injector includes:
an oxidizer inlet;
an oxidizer distributor in fluid communication with the oxidizer inlet;
a fuel inlet;
a fuel distributor in fluid communication with the fuel inlet, the fuel distributer including the at least one fuel injector nozzle positioned to direct a flow of cooling fuel outwardly along the inwardly-facing chamber wall;
a fuel piston movably positioned between the fuel inlet and the fuel distributor;
an oxidizer piston movably positioned between the oxidizer inlet and the oxidizer distributor, and positioned to open an oxidizer flow path between the oxidizer inlet and the oxidizer distributor before the fuel piston open a fuel flow path between the fuel inlet and the fuel distributor.

20. The system of example 19, further comprising
a piston actuator port in fluid communication with the fuel piston and the oxidizer piston; and wherein
the fuel piston is positioned to engage a first surface of the oxidizer piston to drive both the fuel piston and the oxidizer piston to respective closed positions when a pressure at the actuator port is at a first level, and wherein the fuel piston and the oxidizer piston move relative to each other to respective open positions when a pressure at the actuator port is at a second level less than the first level.

21. The system of any of examples 15-20, further comprising:
an oxidant tank coupled to the propellant injector;
an exit vent coupled to the oxidant tank and being configured to release oxidant from the oxidant tank when a pressure differential across a wall of the oxidant tank exceeds a threshold value; and
an entry vent coupled to the oxidant tank and positioned to permit air entry into the oxidant tank during vehicle descent.

22. The system of any of examples 15-21, further comprising:
a fuel tank coupled to the propellant injector;
a check valve coupled to the fuel tank and being configured to close at a preselected pressure corresponding to a non-zero altitude; and
an entry vent coupled to the fuel tank and configured to release at a selected pressure differential to permit air entry into the fuel tank during vehicle descent.

We claim:

1. A rocket propulsion system, comprising
a combustion chamber; and
a propellant injector coupled to the combustion chamber, and including:
an oxidizer inlet;
an oxidizer distributor in fluid communication with the oxidizer inlet;
a fuel inlet;
a fuel distributor in fluid communication with the fuel inlet;
a fuel piston movably positioned between the fuel inlet and the fuel distributor;
an oxidizer piston movably positioned between the oxidizer inlet and the oxidizer distributor, and positioned to open an oxidizer flow path between the oxidizer inlet and the oxidizer distributor before the fuel piston opens a fuel flow path between the fuel inlet and the fuel distributor; and
a piston actuator port in fluid communication with the fuel piston and the oxidizer piston and the oxidizer piston;
wherein;
the fuel piston and the oxidizer piston are nested relative to each other;
the fuel piston and the oxidizer piston are moveable relative to each other;
the fuel piston and the oxidizer piston each have an annular shape;
the fuel piston is positioned within an annulus of the oxidizer piston; and
the fuel piston is positioned to engage a first surface of the oxidizer piston to drive both the fuel piston and the oxidizer piston to respective closed positions when a pressure at the actuator port is at a first level, and wherein the fuel piston and the oxidizer piston move relative to each other to respective open positions when a pressure at the actuator port is at a second level less than the first level.

2. The system of claim 1 wherein the fuel piston is slideable relative to the oxidizer piston.

3. The system of claim 1 wherein the oxidizer distributer includes a plurality of oxidizer outlet orifices positioned to direct a spray of oxidizer radially outwardly, and wherein the fuel distributer includes a fuel outlet positioned to direct a cylindrical flow of fuel transversely to and through the spray of oxidizer.

4. The system of 1, claim wherein the propellant injector includes:
cooling flow orifices positioned to direct a first portion fuel tangentially relative to a curved inner wall of the combustion chamber;
a fuel flow outlet positioned to direct a second portion of fuel axially into the combustion chamber; and
an oxidizer outlet positioned to direct oxidizer outwardly into the combustion chamber, transverse to the second portion of fuel.

5. The system of claim 1, further comprising:
an exhaust nozzle coupled to the combustion chamber, the exhaust nozzle having a throat and an exit downstream of the throat, the exit having an exit cross-sectional area, the nozzle further including a plurality of injection ports positioned to direct an injected flow transverse to an inner wall of the nozzle; and
a controller operatively coupled to the injection ports to (a) direct injection of a fluid through the injection ports to reduce an effective cross-sectional area of the nozzle for operation at a first altitude, and (b) cease injection of the fluid at a second altitude greater than the first altitude.

6. A reusable space vehicle system, comprising:
a reusable horizontal takeoff/horizontal landing (HTHL), ground-assisted single-stage-to-orbit (SSTO) spaceplane; and
a rocket propulsion system, carried by the spaceplane, and including:
a combustion chamber having a curved, inwardly-facing chamber wall enclosing a combustion zone, the chamber having a generally spherical shape with the curved, inwardly-facing chamber wall exposed to the combustion zone; and
a propellant injector coupled to the combustion chamber and having at least one fuel injector nozzle positioned to direct a flow of cooling fuel tangentially relative to the curved, inwardly-facing chamber wall;
a fuel tank coupled to the propellant injector;
a check valve coupled to the fuel tank and being configured to close at a preselected pressure corresponding to a non-zero altitude; and
an entry vent coupled to the fuel tank and configured to release at a selected pressure differential to permit air entry into the fuel tank during vehicle descent.

7. The system of claim 6 wherein the curved, inwardly-facing chamber wall does not include cooling flow channels.

8. The system of claim 6 wherein the at least one fuel injector nozzle is spaced apart from the curved, inwardly-facing chamber wall.

9. The system of claim 6 wherein the propellent injector further includes:
at least one fuel outlet positioned to direct a portion of fuel axially into the combustion chamber; and
at least one oxidizer outlet positioned to direct oxidizer outwardly into the combustion chamber, transverse to the portion of fuel directed axially into the combustion chamber.

10. The system of claim 6 wherein the propellant injector includes:
an oxidizer inlet;
an oxidizer distributor in fluid communication with the oxidizer inlet;
a fuel inlet;
a fuel distributor in fluid communication with the fuel inlet, the fuel distributer including the at least one fuel injector nozzle positioned to direct a flow of cooling fuel outwardly along the curved, inwardly-facing chamber wall;

a fuel piston movably positioned between the fuel inlet and the fuel distributor;

an oxidizer piston movably positioned between the oxidizer inlet and the oxidizer distributor, and positioned to open an oxidizer flow path between the oxidizer inlet and the oxidizer distributor before the fuel piston open a fuel flow path between the fuel inlet and the fuel distributor.

11. The system of claim 10, further comprising
a piston actuator port in fluid communication with the fuel piston and the oxidizer piston; and wherein
the fuel piston is positioned to engage a first surface of the oxidizer piston to drive both the fuel piston and the oxidizer piston to respective closed positions when a pressure at the actuator port is at a first level, and wherein the fuel piston and the oxidizer piston move relative to each other to respective open positions when a pressure at the actuator port is at a second level less than the first level.

12. The system of claim 6, further comprising:
an oxidant tank coupled to the propellant injector;
an exit vent coupled to the oxidant tank and being configured to release oxidant from the oxidant tank when a pressure differential across a wall of the oxidant tank exceeds a threshold value; and
an entry vent coupled to the oxidant tank and positioned to permit air entry into the oxidant tank during vehicle descent.

13. A reusable space vehicle system, comprising:
a reusable horizontal takeoff/horizontal landing (HTHL), ground-assisted single-stage-to-orbit (SSTO) spaceplane;
a rocket propulsion system, carried by the spaceplane, and including:
  a combustion chamber having an inwardly-facing chamber wall enclosing a combustion zone, the chamber having a generally spherical shape with the inwardly-facing chamber wall exposed to the combustion zone; and
  a propellant injector coupled to the combustion chamber and having at least one fuel injector nozzle positioned to direct a flow of cooling fuel outwardly along the inwardly-facing chamber wall;
a fuel tank coupled to the propellant injector;
a check valve coupled to the fuel tank and being configured to close at a preselected pressure corresponding to a non-zero altitude; and
an entry vent coupled to the fuel tank and configured to release at a selected pressure differential to permit air entry into the fuel tank during vehicle descent.

\* \* \* \* \*